Sept. 26, 1944.  E. F. MILLER  2,359,046
BOLTING APPARATUS
Filed Oct. 3, 1942
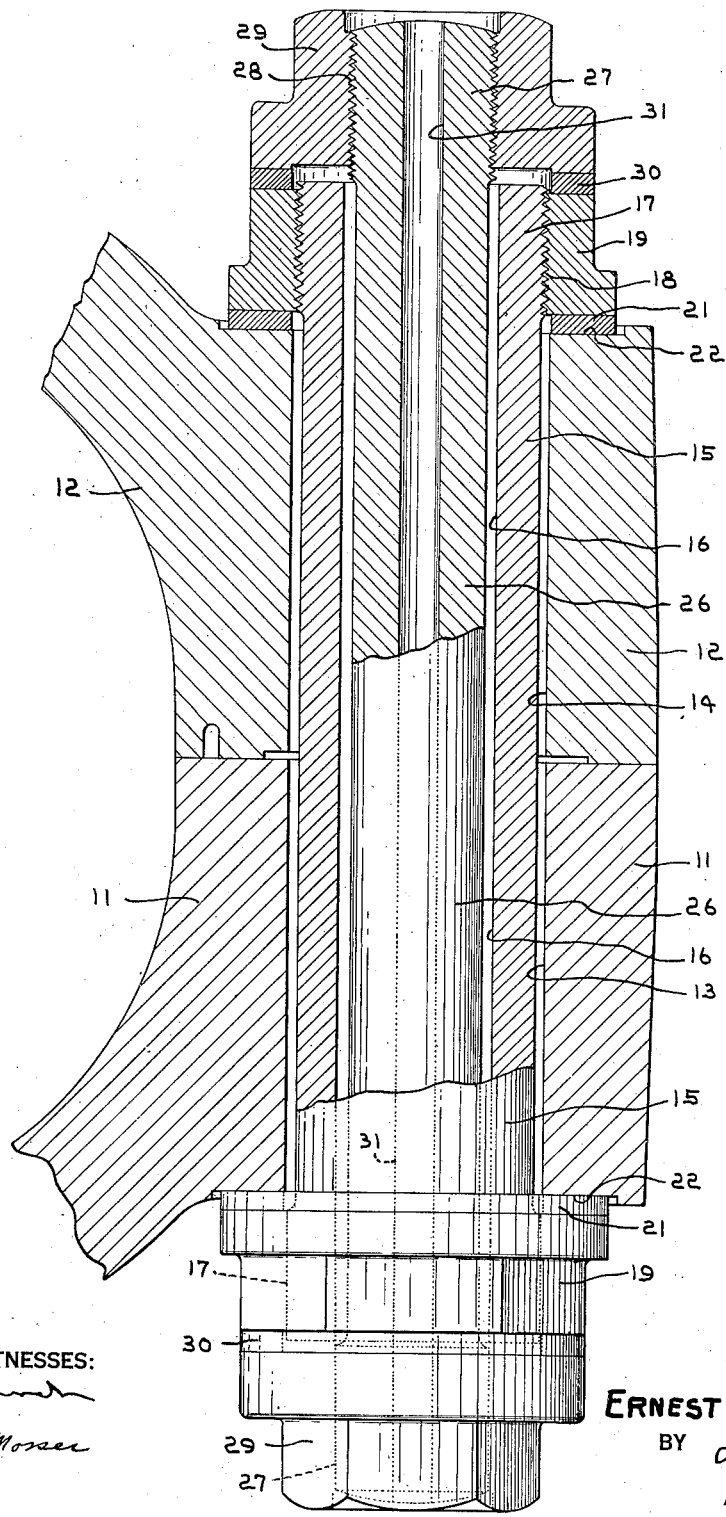
WITNESSES:
INVENTOR
ERNEST F. MILLER.
BY
ATTORNEY Patented Sept. 26, 1944

2,359,046

UNITED STATES PATENT OFFICE 2,359,046

BOLTING APPARATUS

Ernest F. Miller, Lansdowne, Pa., assignor to Westinghouse Electric & Manufacturing Company, East Pittsburgh, Pa., a corporation of Pennsylvania Application October 3, 1942, Serial No. 460,720

5 Claims. (Cl. 85—1)

The invention relates to bolting arrangements, more particularly to such arrangements where bolts of relatively large size are required, and has for an object to provide improved bolting constructions and methods of this character.

In the large turbine industry, the higher temperatures and pressures now commonly used have resulted in the use of larger and larger bolts for securing the mating flanges of turbine casings, it being not uncommon to use bolts of six inches diameter or larger. It is also common practice to thermally stretch such bolts prior to tightening the nuts thereon in order to obtain the desired degree of compression of the joint being bolted without the necessity of applying too much rotational force to the nuts. In order that such bolts may be suitably heated, they are provided with internal bores extending either a material portion of the way through or extending completely from end to end, whereby a suitable heating tool may be inserted therein.

As larger and larger bolts have been used, the heating problem has become more difficult, requiring a bore of larger diameter in order that the requisite amount of heat may be applied in a suitably short time. Furthermore, with these relatively large diameter bolts, the use of fine threads becomes impractical and, at the same time, the use of coarser threads results in greater reduction of useful bolt cross-ssectional area.

Therefore, it is an object of the present invention to provide compound bolts consisting of an outer tubular bolt and an inner bolt which may be either tubular or solid, whereby the bolt tension load may be proportioned between the two bolts in direct proportion to their effective cross-sectional areas.

This and other objects are effected by the invention as will be apparent from the following description and claims taken in connection with the accompanying drawing, forming a part of this application, in which:

The single figure is a transverse sectional view through a bolt assembly constructed in accordance with the present invention.

Referring now to the drawing more in detail, there are shown parts 11 and 12 comprising, for example, the mating halves of a turbine casing, to be bolted together. The parts 11 and 12 are provided with aligned openings 13 and 14, respectively, receiving an outer bolt 15 having a hollow bore 16 extending therethrough from end to end, the bolt 15 being provided at one end with a portion 17 extending beyond the part 12 and being externally threaded, as at 18, for threaded engagement with the nut 19. The latter is adapted to bear, through the washer 21, on the shoulder or surface 22 of the part 12.

An inner bolt 26 extends through the bore 16 of the outer bolt and has an end portion 27 extending beyond the end of the bolt 15, the projecting end being threaded, as at 28, for threaded engagement with the nut 29, which is adapted to bear, through the washer 30, on the upper surface of the nut 19. If desired, the inner bolt 26 may be provided with a longitudinally-extending bore 31 for the reception of a suitable heating tool to prestretch the bolt prior to tightening of the nut 29 thereon.

In assembling the bolt arrangement herein illustrated, the outer bolt 15 is inserted through the aligned openings 13 and 14 in parts 11 and 12 and the nut 19 threaded on the projecting end portion 17; a suitable heating tool inserted in the bore 16 to stretch the bolt by thermal expansion, after which the nut 19 is tightened the desired amount. Thereafter, the inner bolt 26 is inserted in the bore 16, the nut 29 threaded thereon and heat applied to the bolt by insertion of a suitable heating tool in the bore 31, after which the nut 29 is tightened the desired amount.

While in the arrangement herein illustrated, nuts 19 and 29 are provided at each end of each bolt, it will be obvious to those skilled in the art that either or both bolts might be provided with integral heads and that such heads might be at either end of the bolt.

Further, while the invention is herein illustrated in connection with a turbine casing, it will be apparent that its field of application is unlimited.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. Means for compressively engaging a plurality of parts having aligned openings and comprising a cylindrical first bolt having a cylindrical bore extending therethrough from end to end and having an externally threaded end portion, a first nut threaded to said threaded end portion for transmitting compressive stresses to the adjacent one of said parts, a cylindrical second bolt extending through the bore of the first bolt and having a threaded end portion, a second nut threaded to the threaded end portion of the second bolt, and means for transmitting compressive forces from the second nut to said adjacent part independently of the first bolt and of the threaded connection between the latter and the first nut.

2. Structure as specified in claim 1, wherein the effective cross-sectional areas of the first and second bolts are approximately equal.

3. Structure as specified in claim 1, wherein the nut for the second bolt bears on the first nut to transmit compressive stress to the adjacent part.

4. The method of bolting together a plurality of parts having aligned openings which comprises inserting through the aligned openings a first bolt having a bore extending therethrough from end to end and having a threaded end portion, threading a first nut onto said threaded end portion, thermally expanding the bolt by applying heat to the bore thereof, adjusting the nut to bear against the adjacent part with a predetermined force while said bolt is thermally expanded, inserting through the bore of the first bolt a second bolt having a bore and a threaded end portion, threading a second nut on the threaded end portion of said second bolt, thermally expanding the second bolt by applying heat to the bore thereof, and adjusting the second nut to transmit predetermined compressive stress to said adjacent part.

5. Structure as specified in claim 1, wherein the second bolt also is provided with a bore throughout its length, whereby a heating element may be inserted for thermal expansion of the bolt.

ERNEST F. MILLER.